United States Patent [19]

White

[11] 4,005,426
[45] Jan. 25, 1977

[54] SIGNAL PROCESSING METHOD AND APPARATUS

[75] Inventor: Warren D. White, Northport, N.Y.
[73] Assignee: Cutler-Hammer, Inc., Milwaukee, Wis.
[22] Filed: Sept. 10, 1975
[21] Appl. No.: 612,101
[52] U.S. Cl. .................. 343/100 LE; 343/100 CL; 325/305; 325/371
[51] Int. Cl.² ......................................... H04B 7/00
[58] Field of Search .......... 325/305, 371, 374, 367; 343/100 LE, 100 CL

[56] References Cited

UNITED STATES PATENTS

| | | | |
|---|---|---|---|
| 3,167,761 | 1/1965 | Parquier | 343/100 LE |
| 3,435,453 | 3/1969 | Howard | 343/100 LE |
| 3,652,939 | 3/1972 | Levasseur | 325/371 |
| 3,763,490 | 10/1973 | Hadley et al. | 343/100 LE |
| 3,876,947 | 4/1975 | Giraudon | 343/100 CL |
| 3,934,204 | 1/1976 | Hill | 325/305 |

Primary Examiner—Maynard R. Wilbur
Assistant Examiner—T. M. Blum
Attorney, Agent, or Firm—Kevin Redmond

[57] ABSTRACT

An adaptive signal processor including a network that adjusts itself on the basis of power maximization to resolve a raw composite input signal structure at least approximately into its separate statistically independent self-correlated components, or eigenvectors, and automatic gain control circuits for equalizing the power levels, or eigenvalues, of these components. The equalized component signals may be used as inputs to conventional adaptive systems, providing improved settling speed and dynamic range, or may in some cases be used directly, without further adaptive processing.

15 Claims, 5 Drawing Figures

SIGNAL PROCESSING METHOD AND APPARATUS

BACKGROUND

1. Field

This invention relates to improvements in the art of adaptive signal processing, particularly as applied to adaptive filters and more specifically to antenna systems that discriminate directionally against interference by adaptively forming suitable directive patterns.

2. Prior Art

Adaptive antenna systems are described in the following references:

B. Widrow et al., "Adaptive Antenna Systems", Proc. IEEE, Vol. 56 pp 2143–2159 (December 1967)

L. J. Griffiths, "A Simple Adaptive Algorithm for Real-Time Processing in Antenna Arrays" Proc. IEEE, Vol. 57, pp 1696–1704, (October 1969)

C. Giraudon, "Adaptive Antenna Processing", U.S. Pat. No. 3,876,947.

The Giraudon system, although evidently an improvement over its acknowledged predecessors, is quite complex, requires prior knowledge of the direction of arrival of the desired signal and its frequency in order to operate, and is restricted to narrow band useful signals.

The Widrow et al. and the Griffiths system require either prior knowledge of the direction of arrival or else a replica waveform duplicating the desired signal. Both of these systems, and other known iteratively adaptive systems, tend to null relatively quickly on strong interference sources and relatively slowly on weaker but still significant sources, so that the settling time in some signal environments is undesirably long.

Another problem with prior art systems is the provision of sufficient dynamic range capability to avoid suppression of a desired weak signal due to saturation of active elements, such as amplifiers, by relatively strong interference.

SUMMARY

According to this invention, a passive network of ideally lossless adjustable phase shifters, or delay lines, and adjustable directional couplers, or power dividers, is arranged between a plurality N of input ports and an equal number N of output ports. The total power entering the input ports, as from N corresponding antenna elements, is, except for incidental effects, distributed among the N output ports in a manner that depends upon the adjustments of the network elements. By maximizing the power at the first output port, which can be done by an automatic adjustment of a corresponding row of phase shifters and couplers, essentially all the power received from the strongest signal in the environment can be diverted by the network and extracted through the first output port.

In similar manner, the remaining power can be distributed between a succession of output ports, thus separating the received signals in order in accordance with their strengths. Viewed in terms of antenna patterns, the network can direct N beams toward, or nearly toward, N different signal sources lying in respectively different directions, with the power received in each beam appearing at a respective output port. Viewed in terms of matrix algebra, the network resolves the signal environment into its eigenvectors, and the power at each output port is the corresponding eigenvalue.

The adaptive network of this invention may be used in a variety of ways. Depending on the angular separation of the signal sources and the difference in power levels, it may happen that one of the output ports delivers a signal consisting primarily of the desired component with little if any contamination by the interferences. Even when conditions are not ideal, the separation of signals can still be sufficient for direct utilization of one of the output ports.

Another important use of the network is as a preprocessor for prior art adaptive systems, which settle very slowly and suffer saturation effects when the eigenvalue spread is large. In this case the outputs of the present network are equalized by automatic gain control devices, and applied as preprocessed inputs to the prior art processor, which then operates under much more favorable conditions than the raw signal environment provides.

DRAWINGS

DESCRIPTION

Figure 1:
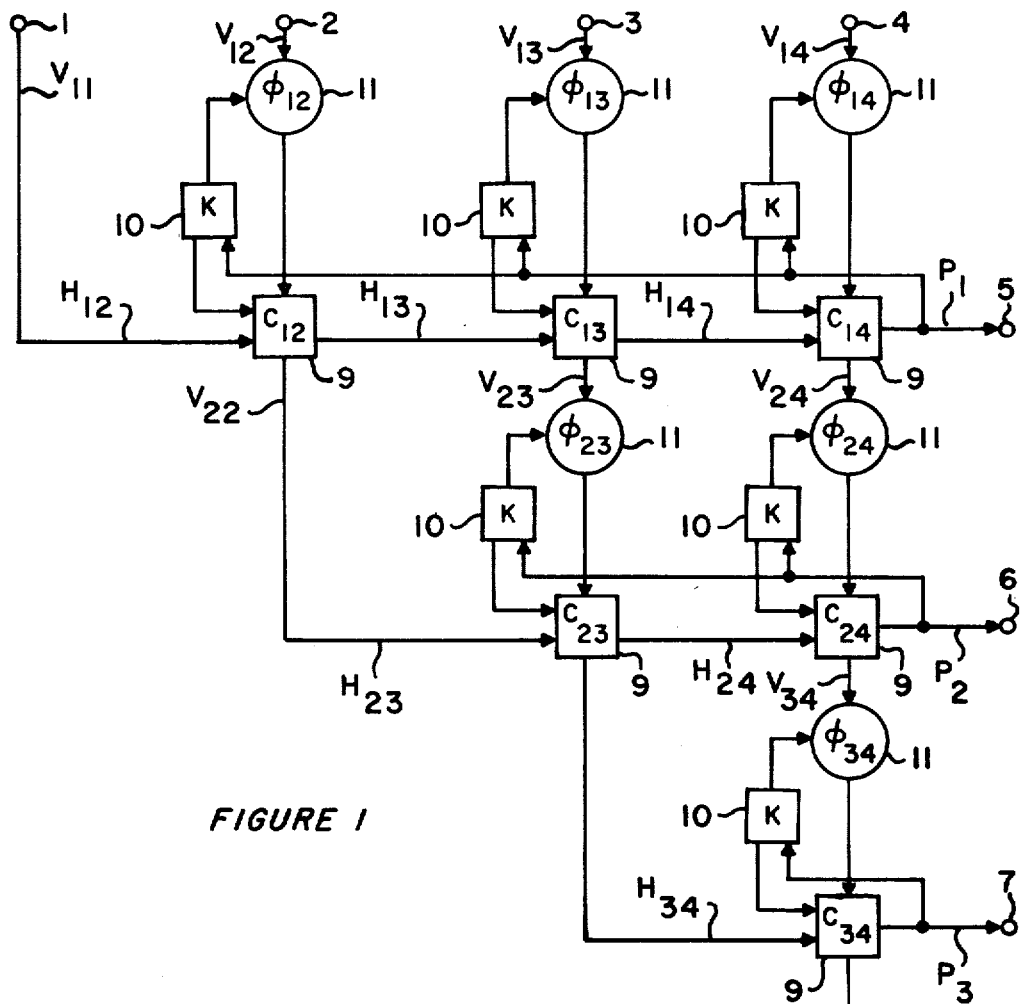
FIG. 1 is a block diagram of a preferred embodiment of the eigenvector network of the invention in its fully implemented form.

Referring to FIG. 1, a plurality N of input ports 1, 2, 3, 4 is coupled to an equal number of ouput ports 5, 6, 7, 8 by way of a triangular matrix of $N(N-1)/2$ coupling devices, each disposed at one of the junctions between lines extending vertically from the input ports and lines extending horizontally to the output ports. The coupling devices along the main diagonal, i.e. where the lower end of a vertical line joins the leftmost end of a respective horizontal line, are simply direct connections as shown.

The rest of the coupling devices, 9, are all alike and are adjustable, electrically or electromechanically, by respective like controller devices 10, represented symbolically by the legend K. The controllers, described later herein, are also arranged to adjust respective phase shifters 11 provided in the vertical lines preceding the adjustable couplers 9.

For purpose of explanation, it is convenient to consider the adjustable couplers 9 as analogous or equivalent to goniometers or resolvers with orthogonally disposed stator windings and orthogonally disposed rotor windings, in the manner of a known type of synchro differential transformer. The device accepts two inputs, of voltage amplitudes $V_{in}$ and $H_{in}$ and provides two outputs of voltage amplitudes $V_{out}$ and $H_{out}$, related as follows:

$$V_{out} = V_{in} \cos\theta + H_{in} \sin\theta, \; H_{out} = V_{in} \sin\theta - H_{in} \cos\theta,$$

where $\theta$ is the angular position of the rotor with respect to a reference axis of the stator.

Denoting cos $\theta$ as a voltage coupling coefficient $c$, that of the coupler 9 at the junction of the $m$ th horizontal line and the $n$ th vertical line is designated $c_{mn}$. Said coupler will receive inputs of voltage amplitudes $V_{mn}$ and $H_{mn}$, and provide outputs of voltage amplitudes $V_{m+1,n}$ and $H_{m,n+1}$.

$$V_{m+1,n} = (1-c_{mn}^2)^{1/2} V_{mn} - c H_{mn}$$
$$H_{m,n+1} = c V_{mn} + (1-c_{mn}^2)^{1/2} H_{mn}$$

Thus the total power input to the coupler is divided into two parts, proportioned according to the adjustment of the coupling coefficient $c$. One part is diverted to the right on the horizontal line, toward the output port, and the remainder is passed downward to the next lower junction.

For the purpose of explanation it is assumed that the phase shifters, couplers and the interconnections between them are all passive, lossless and impedance-matched. These conditions could be simulated very closely by providing amplifiers and/or isolators at suitable points in the network in obvious manner. In practice, said conditions are generally approximated well enough without such refinements.

With the above assumptions, the total power emerging from the output ports 5–8 is exactly equal to the total power entering the input ports 1–4, regardless of the settings of the individual phase shifters and couplers. The distribution of this power among the output ports does depend on the settings, and may be entirely different from the power distribution between the input ports.

Suppose the input ports 1–4 are connected to respective spatially separated elements of an antenna array, not shown. In a typcial signal environment, consisting of a number of signals of different strengths and different frequencies, each input port will receive each signal, with a phase and amplitude relative to that at each other port depending on the relative locations of the corresponding antenna elements.

With the foregoing assumption that all components of the network are matched, power applied to the input ports can flow only downward or to the right in FIG. 1. Assuming matched loads at the output ports, no power can flow upward or to the left. Therefore only the top row of phase shifters 11, designated $\phi_{12}$–$\phi_{14}$, and the top row of couplers 9, designated $c_{12}$–$c_{14}$, can influence the power P1 delivered to the top output port 5. These components can be adjusted to maximize P1, entirely independently of the adjustments of any lower level phase shifters or couplers.

The maximum power deliverable to output port 5 is equal to the maximum eigenvalue of the covariance matrix of the composite input signal structure, and when P1 is maximized, the signal at output port 5 is the corresponding eigenvector signal. After maximization of P1, the phase shifters and couplers in the second row can be adjusted to maximize the power P2 delivered to the second output port 6, again independently of the adjustments of any of the lower phase shifters and couplers in the network. The maximum power available at output port 6 is equal to the second highest eigenvalue, and when P2 is maximized, the signal at output port 6 is the corresponding eigenvector signal.

If we neglect certain second order effects, the number of nonzero eigenvalues will not exceed the number of independent signals present. If the environment consists only of a single signal source, all the incident energy will be delivered to output port 5 and only thermal noise components will be available for ports 6, 7, and 8. If there are two external signal sources in different directions, all of the incident energy will be delivered to output ports 5 and 6 and only thermal noise components are available for terminals 7 and 8. The tendency will be for the stronger of the two signals to appear mostly at port 5 and the weaker one to appear mostly at port 6. The completeness of this separation depends on the angular spacing of the two signals and at certain spacings port 5 will deliver only the stronger signal and port 6 only the weaker of the two.

With three or more signals present in the environment, phase shifter 11 and coupler 9 in the third row are adjusted to maximize the power P3 at the third output port 7. P3 is then equal to the third highest eigenvalue and the signal at port 7 is the corresponding eigenvector signal. Any remaining power will appear at output port 8 and this power is equal to the smallest eigenvalue. The signal at port 8 is the corresponding eigenvector signal.

Although only four rows and four columns are shown in FIG. 1, the network may be extended to five or more of each, to fully process more signals. On the other hand, many applications may be satisfied by a capability of dealing with only one or two dominant signals, even in a roughly approximate manner. In such cases the network can be simplified substantially.

In the fully implemented network of FIG. 1, the described adjustments are made automatically by the respective controllers 10, operating in response to the power levels at the respective output ports. The adjustment operation is iterative along each row because the required values of couplings and phase shifts are interdependent. While the adjustments in the first row are settling, the controllers in lower rows may also operate, but will not settle to their final adjustments until after the next preceding row has settled. Thus the phase and coupling adjustments effectively occur in the sequence previously described. Whenever the signal environment changes appreciably, the adjustment cycle is repeated to accommodate the new conditions.

Figure 2:
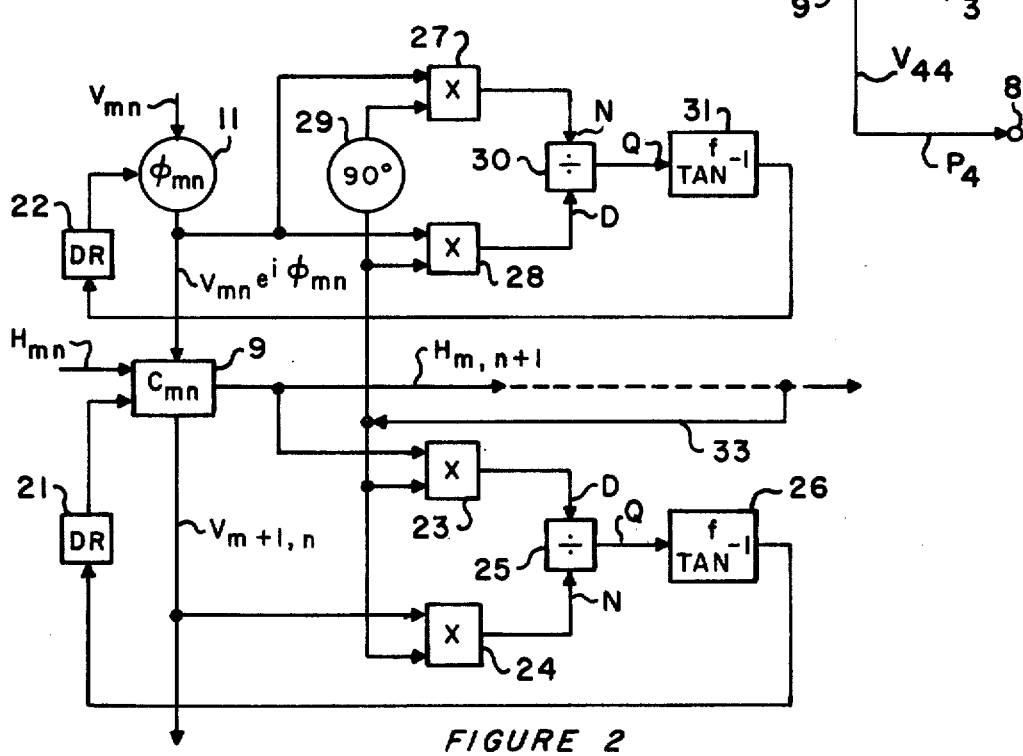
FIG. 2 is a block diagram showing details of a phase shift and coupling control module suitable for use in the system of FIG. 1.

FIG. 2 shows the coupler 9 and phase shifter 11 associated with the junction of the $m$ th horizontal line and the $n$ th vertical line of the above-described network. The remainder of FIG. 2 illustrates the corresponding controller 10. The coupler 9 and phase shifter 11 are arranged to be adjusted by drivers 21 and 22 respectively. In concept, the devices 9 and 11 could be mechanically adjustable, and the drivers could be reversible electric motors. In general, however, it is preferred that the coupler and phase shifter be designed in known manner to be adjustable directly by electrical control inputs provided by way of the drivers.

A control signal for the coupler 9 is provided by the circuit comprising multipliers 23 and 24, divider 25 and arctangent function generator 26, all of suitable known design and connected as shown. The multiplier 23 receives the horizontal output signal $H_{m,n+1}$ from coupler 9 and the signal at the output port of the $m$ th horizontal line. The product signal output of multiplier 23 is the denominator input to divider 25. Multiplier 24 receives the vertical output signal $V_{m+1,n}$ from coupler 9 and the $m$ th line output signal, and its product signal output is the numerator input to divider 25.

The quotient output of divider 25 goes to the function generator 26, which provides an output signal representing the arctangent of said quotient, including its sign. This coupler control signal is applied to the driver 21, which adjusts the coupler 9 in such sense and to such extent as to null said control signal.

A control signal for the phase shifter 11 is provided by the circuit comprising multipliers 27 and 28, 90° phase shifter 29, divider 30 and arctangent function generator 31. Both multipliers receive the output $V_{mn}e^{i\phi_{mn}}$ of the phase shifter 11. The signal at the output port of the $m$ th horizontal line is applied directly to multiplier 28, and through and 90° phase shifter 29 to the multiplier 27. The product output of the multiplier 27 is the numerator input to the divider 30, and the product output of multiplier 28 is the denominator input to the divider. The quotient output of divider 30 is the input to the function generator 31, which produces the phase shifter control signal for the driver 22.

The driver 22 operates in response to its control signal to adjust the phase shifter 11 in such sense and to such extent as to null said control signal. When this signal and the coupler control signal are both nulled, the phase shift $\phi_{mn}$ and coupling coefficient $c_{mn}$ at that junction are at such settings as to maximize the power at the output port of the $m$ th horizontal line under the currently prevailing conditions, i.e. the existing input signal structure and the existing phase and coupling adjustments at the other junctions on the $m$ th horizontal line.

The network of FIG. 1 may be used in a variety of ways. For example, a respective utilization device such as a receiver could be coupled to each output port or a single receiver could be coupled selectively to any output port producing a signal of interest. In either case, the network provides a preselection capability for rejection of unwanted interfering signals or jamming. Another important application is as a preprocessor for adaptive systems such as those described in the Widrow reference. It is known that such systems do not adapt satisfactorily when the eigenvalue spread of the input signal covariance matrix is large. The present invention offers a practical solution to the problem of equalizing the eigenvalues, or at least reducing their spread enough to enable the prior art adaptive system to settle quickly.

Figure 3:
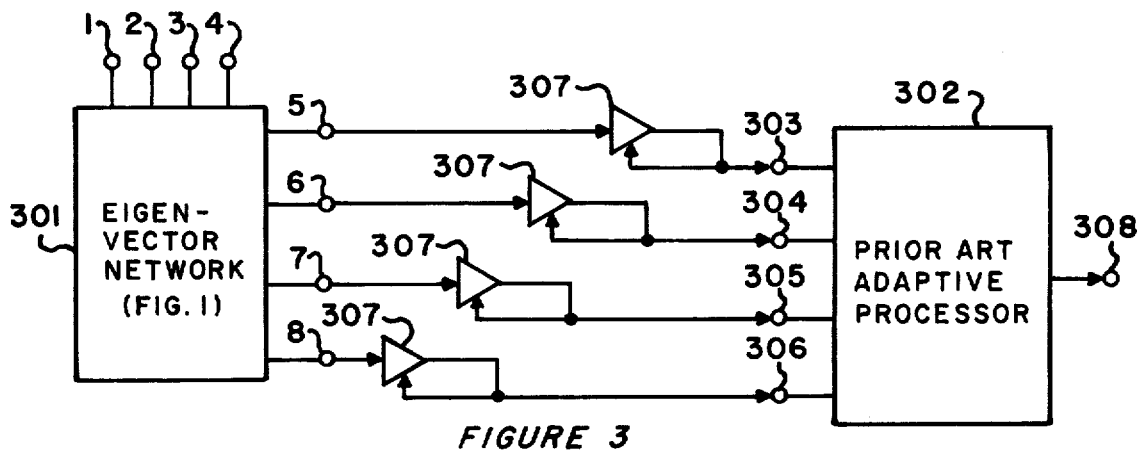
FIG. 3 is a block diagram showing the network of FIG. 1 in a preprocessor for a conventional adaptive processor.

Referring to FIG. 3, the block 301, designated Eigenvector Network, represents the circuit of FIG. 1. Block 302 represents a prior art adaptive processor such as that described in the Widrow reference. For illustration, the network 1 has four input ports and four output ports, as previously described, and the processor 302 has four input ports, 303–306. In conventional prior art practice, the input ports 303–306 would be coupled directly to respective signal sources, such as the elements of an antenna array. In the example of FIG. 3 such sources, not shown, are coupled to the input terminals 1–4 of the network 103.

The output ports 5–8 of the network 301 are coupled to the input ports 303–306 of the processor 302 by way of respective automatic gain control (AGC) devices 307. The AGC devices are designed in well known manner to maintain the r-f carrier amplitudes of their outputs at or approximately at a predetermined level, throughout a range of input amplitudes that exceed a predetermined minimum or threshold level. In other words, said output amplitudes are maintained within a predetermined maximum ratio, ideally unity.

In the operation of the system of FIG. 3, the network 301 separates the composite input signal structure into eigenvector components. Ideally, as described above the eigenvector signals are statistically independent of each other and their covariance matrix is diagonal. After passing through the AGC devices 307, the power levels of the signals will be equal. The resulting covariance matrix remains diagonal, and its diagonal elements are all equal. This matrix is simply a constant times the identity matrix, and is in the best possible condition for operation of the processor 302, which operates as described in the Widrow reference to provide the desired signal at its output port 308.

Both the processor 302 and the network 301 adapt recursively, and therefore require time to converge, or settle to their appropriate adjustments. However, under the input signal conditions for which the settling of the conventional processor 302 is quite slow, the convergence of the network 301 is rapid. Thus the settling time of the overall system is materially less than that of the prior art processor alone under such conditions.

Figure 4:
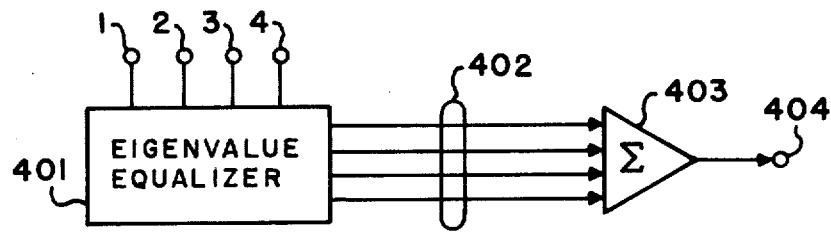
FIG. 4 illustrates an application of the eigenvalue equalizer of this invention as a main processor.

Another application of the invention is illustrated in FIG. 4, where the block 401, designated Eigenvalue Equalizer, includes the network 301 and AGC devices 307 of FIG. 3. Lines 402 connect the output ports of the AGC devices in the equalizer 401 to respective input ports of a summing device 403, which provides at its output port 404 a composite signal structure containing the same components as that applied to the input ports 1–4, equalized in their power levels. In this case, with four inputs, the power level of each component will be one fourth the total power at port 404.

Considering one of said components as a desired signal and the others as interference, the signal to interference ratio at port 404 will be minus 6 dB. If there were five ports, the ratio would be minus 7 dB, and so on. It is readily possible with presently available spread spectrum techniques to extract useful information from a desired signal 20 dB or more below the interference level. Thus, in some circumstances, the adaptive processor 302 of FIG. 3 can be replaced by a simple summing device which is much less expensive and requires no settling time.

The invention has been described thus far with reference to the fully implemented network of FIG. 1. However, any network which produces a substantial reduction in eigenvalue spread can be useful, for example as a preprocessor in a system similar to that of FIG. 3. The network of FIG. 1 can be greatly simplified by omitting all but the upper row of phase shifters, controllers and couplers, and bringing the vertical outputs $V_{22}$, $V_{23}$ and $V_{24}$ directly out to output ports 6, 7 and 8 respectively.

This arrangement works very effectively in the systems of FIGS. 3 and 4 when a single, powerful undesired signal dominates the environment, as is often the case. The upper row extracts the strong eigenvector at port 5 for individual control by the respective AGC device, and a mixture of the weaker signals appears at each of ports 6, 7 and 8. The resultant covariance matrix is not purely diagonal and the eigenvalues are not fully equalized, but this nonideal signal combination is better suited to the final processing algorithm than the raw input signal combination.

As described above, the fully implemented network of FIG. 1 settles recursively because the phase and amplitude adjustments along each row are interdependent. The settling process is exponential, with finite time constants. When a single signal dominates the environment, it is sufficient to make the adjustments at each junction so as to maximize the power flowing out horizontally from that junction. The adjustments are made independently at each junction without regard to signals at points to the right of it, and no iteration occurs. Accordingly, the total settling time is limited to a determinable finite interval. This operation may be implemented simply by wiring the controllers 10 to sense the horizontal output from the respective junction rather than the output port of the horizontal line. Referring to FIG. 2, the output sensing line 33 is connected directly to the output port of the corresponding coupler 9.

Figure 5:
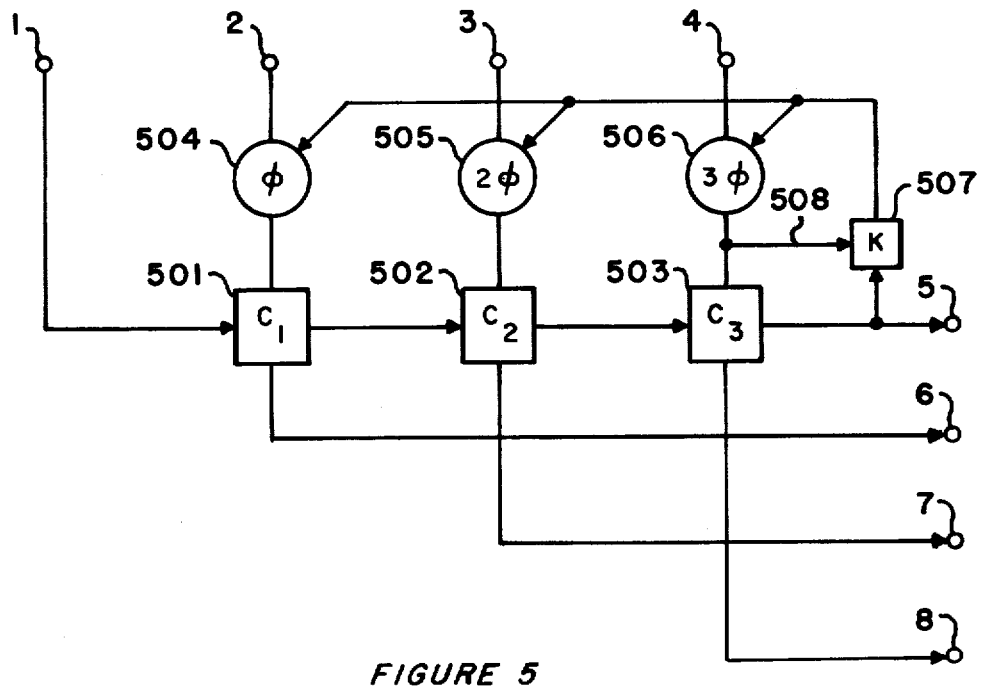
FIG. 5 is a block diagram of a simplified embodiment of the network of FIG. 1.

Numerous other variations of the network and its control logic are possible, and are useful in situations that do not justify the cost and complexity of the fully implemented embodiment. A greatly simplified modification is shown in FIG. 5. Here only the uppermost row is provided with couplers 501–503 which, unlike those in FIG. 1, are fixed. The associated phase shifters 504–506 are adjustable, but are ganged for operation by a single controller 507 to provide successively larger phase shifts. Assuming the input ports are to be coupled to equally spaced elements of an array, and phase shifter 504 is adjusted to provide a phase shift $\phi$, then phase shifter 505 would be set a $2\phi$ and phase shifter 506 at $3\phi$.

The coupling coefficients of couplers 501, 502 and 503 are fixed at arcsin (radians) $2^{-1/2}$, $3^{-1/2}$ and $4^{-1/2}$, respectively. If there were a fourth coupler, its coefficient would be fixed at arcsin $5^{-1/2}$. The horizontal output of coupler 503 goes to the uppermost output port 5. The other output ports 6, 7 and 8 are connected directly to the vertical outputs of couplers 501, 502 and 503 respectively. The controller 507 is designed in known manner, for example like the upper part of FIG. 2, to drive the phase shifters to a setting that maximizes the power level at output port 5. A suitable phase sense reference may be obtained from the output of any of the phase shifters, as by way of line 508 from shifter 506.

As there is in effect only one independent variable, phase gradient, the network of FIG. 5 settles nonrecursively in a single step. If a single signal dominates the input combination, substantially all of that signal will appear at output port 5. If the input ports are coupled to respective spaced antenna elements, the network operates to make the output at port 5 correspond to a main pattern lobe directed toward the source of the dominant signal. The outputs at ports 6, 7 and 8 correspond to patterns that are approximately omnidirectional except for a null in the direction of said source.

I claim:

1. The method of processing a composite of raw input signals having common components in separately variable proportions to produce an output wherein one of said components predominates, and at least one other output wherein said one component does not predominate, comprising the steps of:
    a. diverting portions of all said raw inputs and passing the remainders thereof,
    b. combining said diverted portions to produce a first output,
    c. adjusting the phases of said raw inputs to maximize said first output, and
    d. combining said remainders of said raw inputs to produce at least one further output.

2. The method set forth in claim 1, further including the step of:
    e. adjusting the amplitude relationships between said diverted portions of said raw inputs and their remainders to maximize said first output.

3. The method set forth in claim 1, including the additional steps of:
    f. diverting portions of said remainders and passing the further remainders thereof,
    g. combining said diverted portions of said first remainders to produce a second output,
    h. adjusting the phases of said first remainders and the amplitude relationships between said diverted portions of said first remainders and their second remainders, to maximize said second output, and
    i. combining said second remainders to produce at least one further output.

4. The method set forth in claim 3, wherein said step (i) consists of treating said second and subsequent sets of remainders in the manner said first set is treated in steps (f), (g) and (h) to produce and maximize respective further outputs.

5. The method of claim 4, wherein the number of said maximized outputs is equal to the number of said raw inputs.

6. The method of claim 1, further including the step of maintaining the amplitudes of said first and further outputs within a predetermined maximum ratio.

7. The method of claim 2, further including the step of maintaining the amplitudes of said first and further outputs within a predetermined maximum ratio.

8. The method of claim 3, further including the step of maintaining the amplitudes of said first and further outputs within a predetermined maximum ratio.

9. The method of claim 4, further including the step of maintaining the amplitudes of said first and further outputs within a predetermined maximum ratio.

10. Apparatus for processing a composite of raw inputs having common components in separately variable proportions to produce an output wherein one of said components predominates, and at least one other output wherein said component does not predominate, comprising
    a. means for diverting portions of all said raw inputs and passing the remainders thereof,
    b. means for combining said diverted portions to produce a first output,
    c. means for adjusting the phases of said raw inputs to maximize said first output, and
    d. means for producing at least one further output from said remainders of said raw inputs.

11. The invention set forth in claim 10, wherein said diverting means (a) is adjustable, further including
    e. means for adjusting said means 8a) to maximize said first output.

12. The apparatus claimed in claim 10, further including additional means similar to means (a), (b) and (c) for diverting portions of the respective remainders, combining them to produce at least one additional output, and maximizing said additional output.

13. The invention set forth in claim 10, further including means for maintaining the amplitudes of said first and further outputs within a predetermined maximum ratio.

14. The invention set forth in claim 11, further including means for maintaining the amplitudes of said first and further outputs within a predetermined maximum ratio.

15. The invention set forth in claim 12, further including means for maintaining the amplitudes of said first and further outputs within a predetermined maximum ratio.

* * * * *